US008907964B2

(12) United States Patent
Lee et al.

(10) Patent No.: US 8,907,964 B2
(45) Date of Patent: Dec. 9, 2014

(54) SYSTEM AND METHOD FOR DYNAMICALLY RECONFIGURING A VERTEX CACHE

(75) Inventors: Keith Lee, San Jose, CA (US); Mike M. Cai, Newark, CA (US)

(73) Assignee: Vivante Corporation, Sunnyvale, CA (US)

( * ) Notice: Subject to any disclaimer, the term of this patent is extended or adjusted under 35 U.S.C. 154(b) by 631 days.

(21) Appl. No.: 11/786,365

(22) Filed: Apr. 10, 2007

(65) Prior Publication Data

US 2008/0256300 A1    Oct. 16, 2008

(51) Int. Cl.
*G09G 5/36*    (2006.01)
*G06F 12/02*   (2006.01)
*G06F 13/00*   (2006.01)
*G06F 13/28*   (2006.01)
*G06T 1/60*    (2006.01)
*G06F 12/08*   (2006.01)
*G06T 15/00*   (2011.01)
*G09G 5/39*    (2006.01)

(52) U.S. Cl.
CPC ............. *G06F 12/0875* (2013.01); *G06T 1/60* (2013.01); *G09G 2360/128* (2013.01); *G09G 5/363* (2013.01); *G06F 2212/601* (2013.01); *G06T 2200/28* (2013.01); *G09G 5/39* (2013.01); *G06T 15/005* (2013.01); *G09G 2360/121* (2013.01)
USPC ........... 345/557; 345/543; 711/171; 711/172; 711/173

(58) Field of Classification Search
None
See application file for complete search history.

(56) References Cited

U.S. PATENT DOCUMENTS

| | | | | |
|---|---|---|---|---|
| 5,887,155 | A * | 3/1999 | Laidig | 716/52 |
| 6,701,387 | B1 * | 3/2004 | Pannel et al. | 710/22 |
| 6,704,021 | B1 * | 3/2004 | Rogers et al. | 345/543 |
| 6,717,577 | B1 * | 4/2004 | Cheng et al. | 345/419 |
| 7,366,842 | B1 * | 4/2008 | Acocella et al. | 711/118 |
| 7,400,325 | B1 * | 7/2008 | Gimby et al. | 345/421 |
| 7,505,036 | B1 * | 3/2009 | Baldwin | 345/421 |
| 7,519,774 | B2 * | 4/2009 | Katsuki et al. | 711/119 |
| 2004/0233208 | A1 * | 11/2004 | Hussain | 345/557 |
| 2005/0200629 | A1 * | 9/2005 | Morein et al. | 345/557 |
| 2006/0119600 | A1 * | 6/2006 | Lokovic et al. | 345/426 |
| 2007/0296720 | A1 * | 12/2007 | Doyle | 345/423 |
| 2008/0094412 | A1 * | 4/2008 | Jiao et al. | 345/621 |
| 2008/0117221 | A1 * | 5/2008 | Hutchins et al. | 345/506 |

* cited by examiner

*Primary Examiner* — Maurice L McDowell, Jr.
*Assistant Examiner* — Donna J Ricks
(74) *Attorney, Agent, or Firm* — David R. Stevens; Stevens Law Group (57) ABSTRACT

A system to process a plurality of vertices to model an object. An embodiment of the system includes a processor, a front end unit coupled to the processor, and cache configuration logic coupled to the front end unit and the processor. The processor is configured to process the plurality of vertices. The front end unit is configured to communicate vertex data to the processor. The cache configuration logic is configured to establish a cache line size of a vertex cache based on a vertex size of a drawing command.

17 Claims, 8 Drawing Sheets

SYSTEM AND METHOD FOR DYNAMICALLY RECONFIGURING A VERTEX CACHE

BACKGROUND

The use of cache is common in computer processor designs. In particular, cache is used in various designs of central processing units (CPUs), graphical processing units (GPUs), and video processors. In conventional cache designs, the size of the cache is fixed. In other words, the size of each cache line and the number of cache lines within the cache is the same for different commands and operations.

In computer graphics systems, caches are typically used to store vertices of triangles or other polygons which are used to model objects. An object can be modeled with a single triangle or thousands or millions of triangles. In conventional computer graphics systems, these vertices are stored in a vertex cache with a fixed cache line size and a fixed number of cache lines. Since different graphics commands can use different sizes of vertices, the cache line size of conventional computer graphics systems is typically set at a fixed size to accommodate the maximum possible vertex size. However, this allocation of cache memory is not efficient in many instances because many commands use a vertex size that is smaller than the maximum possible vertex size. In other words, each cache line may have extra memory capacity that is not used because the vertex size is smaller than the fixed cache line size.

SUMMARY

Embodiments of a system are described. In one embodiment, the system is configured to process a plurality of vertices to model an object. An embodiment of the system includes a processor, a front end, and cache configuration logic. The front end unit is coupled to the processor. The cache configuration logic is coupled to the front end unit and the processor. The processor is configured to process the plurality of vertices. The front end unit is configured to communicate vertex data to the processor. The cache configuration logic is configured to establish a cache line size of a vertex cache based on a vertex size of a drawing command. Other embodiments of the system are also described.

Embodiments of a method are also described. In one embodiment, the method is a method for dynamically reconfiguring a vertex cache for vertex processing. An embodiment of the method includes receiving a draw command. The draw command is associated with a plurality of vertices. The method also includes determining a vertex size of the plurality of vertices, and configuring a cache line size of the vertex cache based on the vertex size of the plurality of vertices. Other embodiments of the method are also described.

As used herein, coupled components or entities are intended to broadly include components that are physically connected, and also includes entities that are not physically connected but that are able to communicate or otherwise transmit a signal or information by various means. Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
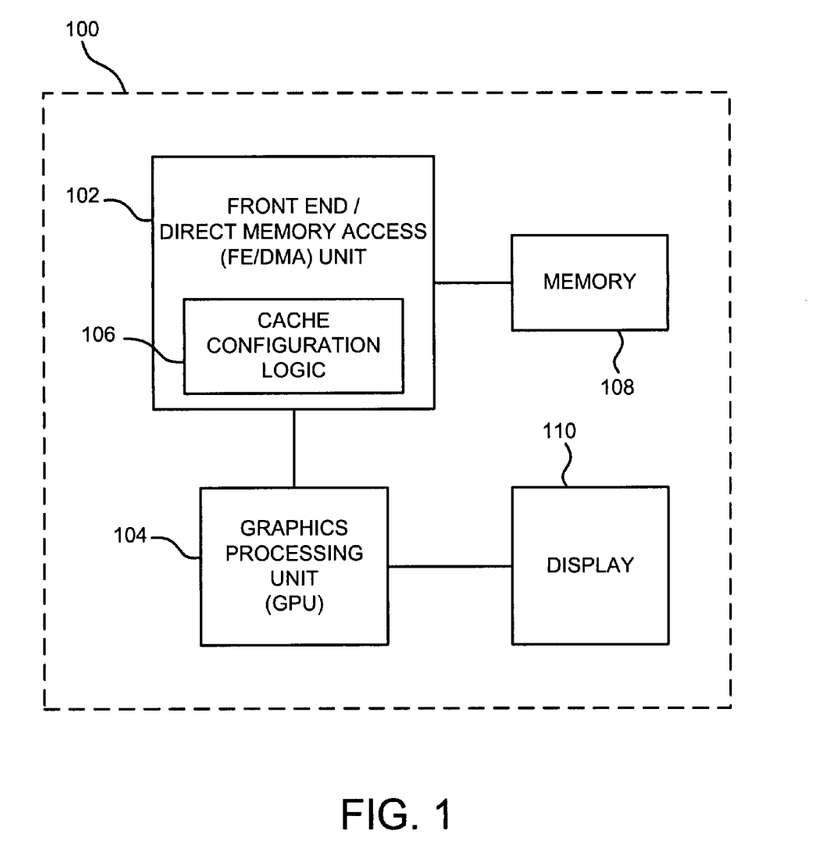
FIG. 1 illustrates a schematic block diagram of one embodiment of a computer graphics system.

FIG. 1 illustrates a schematic block diagram of one embodiment of a computer graphics system 100. The illustrated computer graphics system 100 includes a front end/direct memory access (FE/DMA) unit 102 and a graphics processing unit (GPU) 104. The FE/DMA unit 102 includes cache configuration logic 106. The graphics processing system 100 also includes an electronic memory device 108 coupled to the FE/DMA unit 102, and a display device 110 coupled to the GPU 104. Although the illustrated computer graphics system 100 shows certain component parts, other embodiments of the computer graphics system 100 may include fewer or more component parts.

In general, the computer graphics system 100 is configured to model objects and to display the modeled objects on the display device 110. Objects are often modeled with polygons such as triangles having three vertices and three edges, or sides, connecting the three vertices. An object can be modeled with a single triangle, or it can be modeled with thousands, or millions, of triangles. To model an object, the computer graphics system 100 may store and reference the vertices of each triangle. Additional details are provided below in regard to the storage and processing of object vertices.

In one embodiment, the FE/DMA unit 102 controls the input traffic of command streams and the various DMA vertex streams feeding the graphics pipeline. The FE/DMA unit 102 also interfaces to the local memory device 108 to pull in various streams of vertices. Alternatively, the memory device 108 may be integrated with the FE/DMA unit 102. Once the streams of vertices are pulled in, the FE/DMA unit 102 assembles and formats the streams into one vertex stream. Additionally, the FE/DMA unit 102 does the element assembly for inputting the vertex into a vertex shader (not shown). In one embodiment, the FE/DMA unit 102 also includes a buffer (refer to the description of FIG. 3) that can be configured as a vertex cache or a stream assembly first-in first-out (FIFO) buffer. The output of the cache or stream assembly buffer couples to a format/conversion unit (not shown), which assembles the various elements for the vertex shader. Since vertex shaders are known in the art, further details of the functionality of the vertex shader are not described herein.

Figure 2:
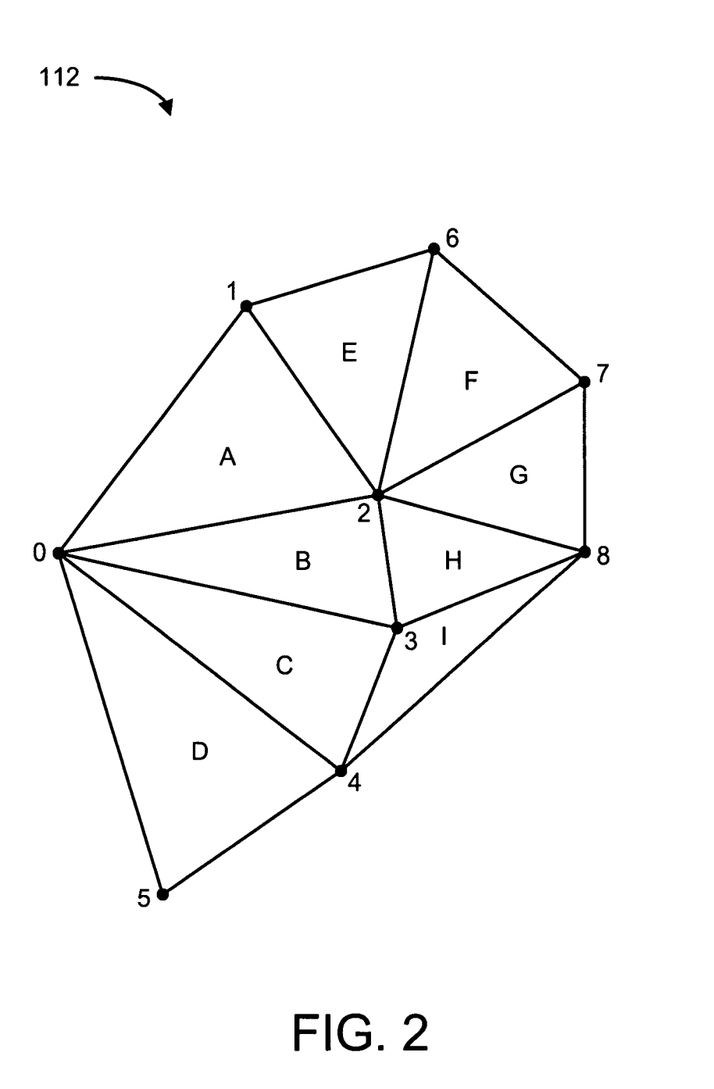
FIG. 2 illustrates a schematic diagram of one embodiment of a graphical representation of an object.

FIG. 2 illustrates a schematic diagram of one embodiment of a graphical representation of an object 112. Although the depicted object 112 only includes triangles, other types of primitives, or polygons, may be used to graphically represent the object 112. For ease of reference, each triangle is given a letter designation of "A" through "I" to refer to a particular set of vertices. For example, triangle "A" is defined by vertices 0, 1, and 2. This set of vertices for triangle "A" also may be written as (0, 1, 2) to indicate that vertices 0, 1, and 2 define triangle "A." Hence, an object command for the depicted object 112 may be similar to the following:

Object:
Triangle "A": (0, 1, 2);
Triangle "B": (0, 2, 3);
Triangle "C": (0, 3, 4);
Triangle "D": (0, 4, 5);
Triangle "E": (1, 2, 6);
Triangle "F": (2, 6, 7);
Triangle "G": (2, 7, 8);
Triangle "H": (2, 3, 8);
Triangle "I": (3, 4, 8);

This exemplary object command defines each of the triangles "A" through "I" with a corresponding set of vertices selected from vertices 1-8. In one embodiment, the vertex numbers 1-8 are used as an index to a vertex buffer (refer to FIG. 3). This mode of operation of the computer graphics system 100 is referred to as vertex mode. Alternatively, the separate reference may be made to tags in an index buffer, described in more detail below. This mode of operation of the computer graphics system 100 is referred to as index mode, because the computer graphics system 100 uses an index buffer in addition to the vertex buffer.

In general, each vertex includes of number of elements that describe the properties of the corresponding vertex. The size of each element and the number of elements of a vertex can vary. In one embodiment, the number of elements in a vertex varies, for example, from 1 to 16 elements. Additionally, an element varies in size between 1 to 16 bytes. Therefore, using these exemplary ranges, the size of a single vertex varies from 16 bytes (e.g., 16 elements of 1 byte per element) to 256 bytes (e.g., 16 elements of 16 bytes per element).

Figure 3:
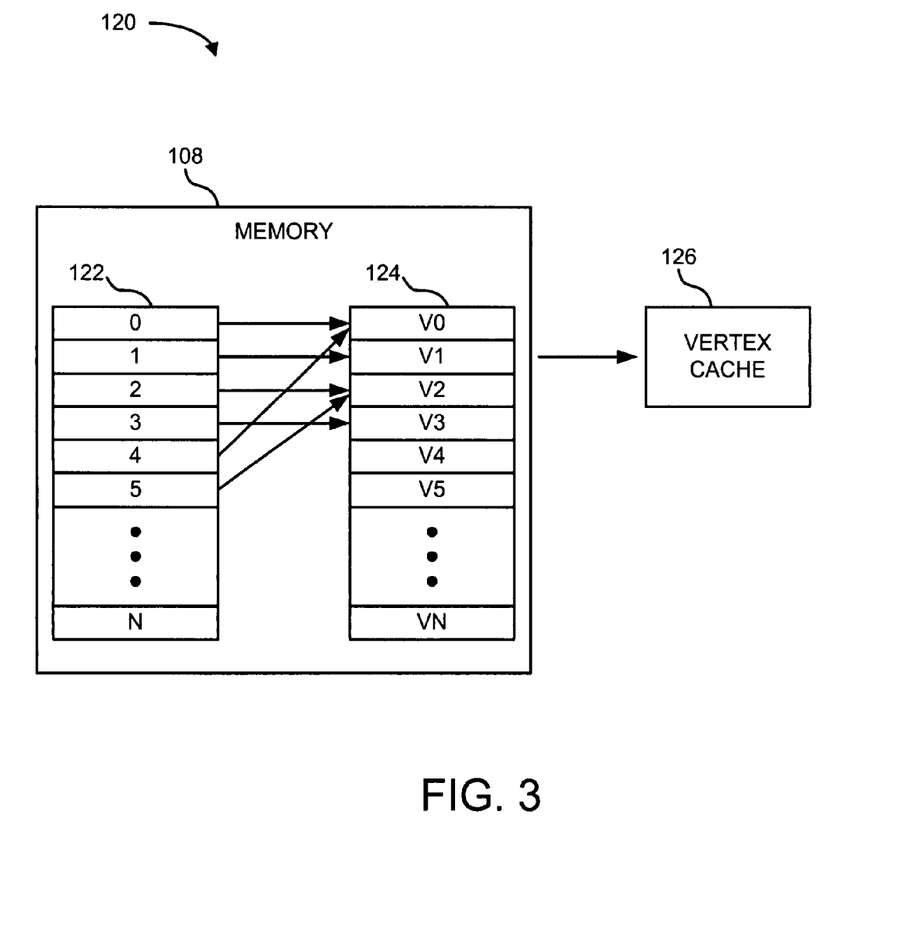
FIG. 3 illustrates a schematic block diagram of one embodiment of a cache system within a computer graphics system.

FIG. 3 illustrates a schematic block diagram of one embodiment of a cache system 120 within a computer graphics system such as the computer graphics system 100 of FIG. 1. The illustrated cache system 120 includes the memory 108 and a vertex cache 126. Alternative embodiments of the cache system 120 may include other components in addition to the memory 108 and the vertex cache 126.

In one embodiment, the memory 108 stores an index buffer 122 and a vertex buffer 124. The vertex buffer 124 contains a collection of vertices that represent a portion of an object, a complete object, or multiple objects. The index buffer 122 is used when the computer graphics system 100 operates in the index mode, as described above. When the computer graphics system 100 operates in the vertex mode, the index buffer 122 may be omitted or, alternatively, disregarded. As an example of the operation of the computer graphics system 100 in vertex mode, a drawing command may be issued to draw two triangles. In order to draw the two requested triangles, the FE/DMA unit 102 reads the vertices in order from the vertex buffer 124. Each consecutive set of three vertices represents a triangle. So the first triangle would include vertices V0, V1, and V2. The second triangle would include vertices V3, V4 and V5. As a further example, the vertices V0-V5 may be given the following coordinates:

| VERTEX | COORDINATES |
|--------|-------------|
| V0 | (−1, −1) |
| V1 | (−1, 1) |
| V2 | (1, 1) |

-continued

| VERTEX | COORDINATES |
|--------|-------------|
| V3 | (1, −1) |
| V4 | (−1, −1) |
| V5 | (1, 1) |

Using this list of coordinates for the vertices V0-V5 in the vertex mode, the first triangle would include the vertices (−1, −1), (−1, 1), and (1, 1). The second triangle would include the vertices (1, −1), (−1, −1), and (1, 1). It should be noted that implementations of the vertex mode may be duplicative because certain vertices are duplicated in the vertex buffer 124. For example, the coordinates for vertices V0 and V4 are the same, and the coordinates for V2 and V5 are the same.

In the index mode, indices from the index buffer 122 may be used to point to the corresponding vertices in the vertex buffer 124, instead of using the vertices in the vertex buffer 124 directly. In this way, the duplicative coordinates for V4 and V5 can be omitted from the vertex buffer 124. In order to draw the same triangles previously referred to by vertices V0-V5, the index buffer 122 may simply reference vertices V0-V3, since vertices V4 and V5 are duplicative of vertices V0 and V2. As an example, the index buffer 122 may include the following:

| INDEX | VERTEX | COORDINATES |
|-------|--------|-------------|
| 0 | V0 | (−1, −1) |
| 1 | V1 | (−1, 1) |
| 2 | V2 | (1, 1) |
| 3 | V3 | (1, −1) |
| 4 | V0 | (−1, −1) |
| 5 | V2 | (1, 1) |

As a matter of nomenclature, it may be helpful to distinguish between the tags used to individually index the index buffer 122 and the vertex buffer 124 from the content stored within the index buffer 122 and the vertex buffer 124. In one embodiment, the tags 0-N may be used with the index buffer 122 to refer to particular entries within the index buffer 122. The actual content of the index buffer 122 may simply be pointers to the tags used to index the vertex buffer 124. In other words, the index tag 0 may reference element 0 within the index buffer 122, which stores vertex tag V0 to reference to the vertex buffer 124. Similarly, the vertex tags V0-VN may be used with the vertex buffer 124 to refer to particular entries within the vertex buffer 124, while the actual content of the vertex buffer 124 are the specific coordinates. In other words, the tag V0references the first element within the vertex buffer 124, which stores, for example, coordinates (−1, −1). Other embodiments may be implemented and other nomenclatures may be used instead of, or in addition to, the embodiments and nomenclature described herein.

In one embodiment, the cache system 120 implements a vertex cache 126 in order to provide faster access to at least some of the vertex data stored in the vertex buffer 124. In particular, the vertex cache 126 may store some or all of the vertices for a specific drawing command. Each command corresponds to one object. In general, the properties of an object do not vary within object itself. Hence, all of the vertices used to model the object typically have the same number of elements, and the elements have the same size. For example, a drawing command for an object may include 8 vertices. Each vertex may include 16 elements. Each element may be 16 bytes in size. Therefore, each of the 8 vertices may have a size of 256 bytes, and the object may have a total size of about 2,048 bytes.

In contrast, the properties between different objects may vary significantly in the number of elements and in the size of each element. Hence, the cache requirements for different commands also vary because the cache requirements depend at least in part on the number of vertices that make up the corresponding object, the number of elements per vertex, and the size of each element.

In general, objects are modeled with triangle mesh or triangle strips. Consequently, many triangles share the same vertex. In one embodiment, the computer graphics system 100 is designed to take advantage of this by rendering triangles that are close together with the same vertex. Using the on chip cache 126, the same vertex can be used multiple times to save memory bandwidth and vertex processing. However, a conventional cache is typically designed with a fixed entry size based on the largest possible vertex size. This conventional implementation consumes a large amount of on chip memory, especially when the vertex size is small, because much of the cache memory is not used even though it occupies die area and consumes power.

Since the efficiency of a cache (e.g., the cache hit rate) is related to the number of cache lines in the cache, a larger the number of cache lines increases the cache efficiency and the performance of the GPU 104, to a point. However, the cache cannot have an infinite number of cache lines since the cost would be too high. Although the cache should be able to handle the largest vertex size, most modeled objects are generally modeled with vertices equal to or smaller than a threshold size, which is much smaller than the largest possible size.

In one embodiment, the cache configuration logic 106 takes advantage of the potential to increase cache performance by dynamically reconfiguring the cache 126. The cache configuration logic 106 may reconfigure the cache 126 by modifying the cache line size and the number of cache lines of the cache 126. This facilitates reduction of the cache size (i.e., cost of the design) and, hence, improved performance of the computer graphics system 100. Additional details of embodiments of dynamically reconfiguring the cache 126 are provided below.

Figure 4:
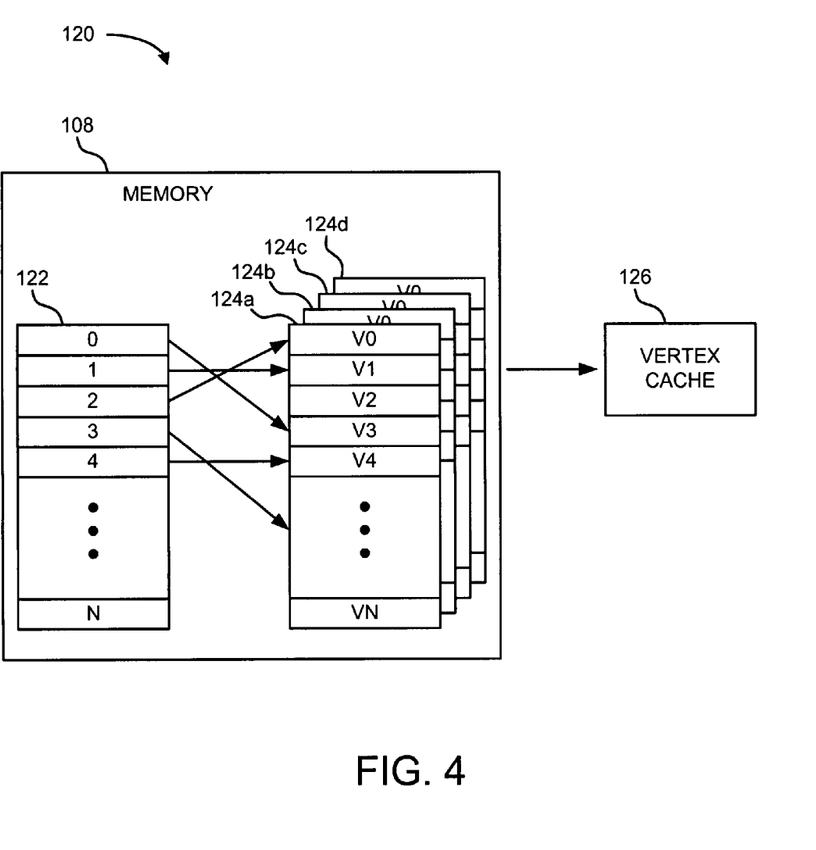
FIG. 4 illustrates a schematic block diagram of another embodiment of a cache system within a computer graphics system.

FIG. 4 illustrates a schematic block diagram of another embodiment of a cache system 120 within a computer graphics system such as the computer graphics system 100 of FIG. 1. The cache system 120 of FIG. 4 is substantially similar, in many aspects, to the cache system 120 of FIG. 3. However, the cache system 120 of FIG. 4 illustrates multiple vertex buffers 124a-124d which may be used to store a greater number of vertices. Each vertex buffer 124a-124d may be accessed with a buffer-specific offset. For example, the vertex buffer 124a may be accessed with an offset of zero, the vertex buffer 124b may be accessed with an offset of 1 Kbyte, the vertex buffer 124c may be accessed with an offset of 2 Kbytes, and the vertex buffer 124d may be accessed with an offset of 3 Kbytes. These offsets are exemplary and other embodiments may use other offset amounts. Any of the vertex buffers 124a-124d may be accessed to populate the vertex cache 126 in response to a cache miss.

Figure 5:
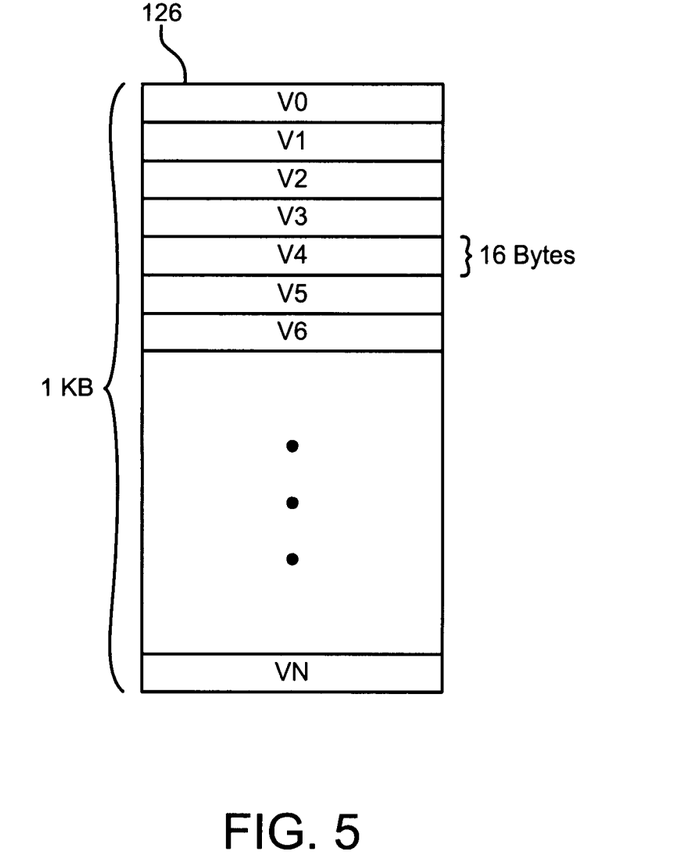
FIG. 5 illustrates a schematic diagram of one embodiment of a vertex cache.

FIG. 5 illustrates a schematic diagram of one embodiment of a vertex cache 126. The vertex cache 126 includes several cache entries designated as V0 through VN (using similar notation as the vertex buffer 124). Each cache entry occupies one cache line in the vertex cache 126. The size of the cache line depends on the size of the vertex stored in the cache entry. In one embodiment, the vertex cache 126 is stored in random access memory (RAM), although other embodiments may be stored in another type of memory or data storage device. In general, for a given size of the vertex cache 126, the cache configuration logic 106 is configured to adjust the cache line size and, hence, the number of cache lines (i.e., entries) that the vertex cache 126 can hold. For example, if the size depicted vertex cache 126 is 1 Kbyte and the vertex size is 16 bytes, then the vertex cache 126 can include as many as 64 cache lines, or entries.

Figure 6:
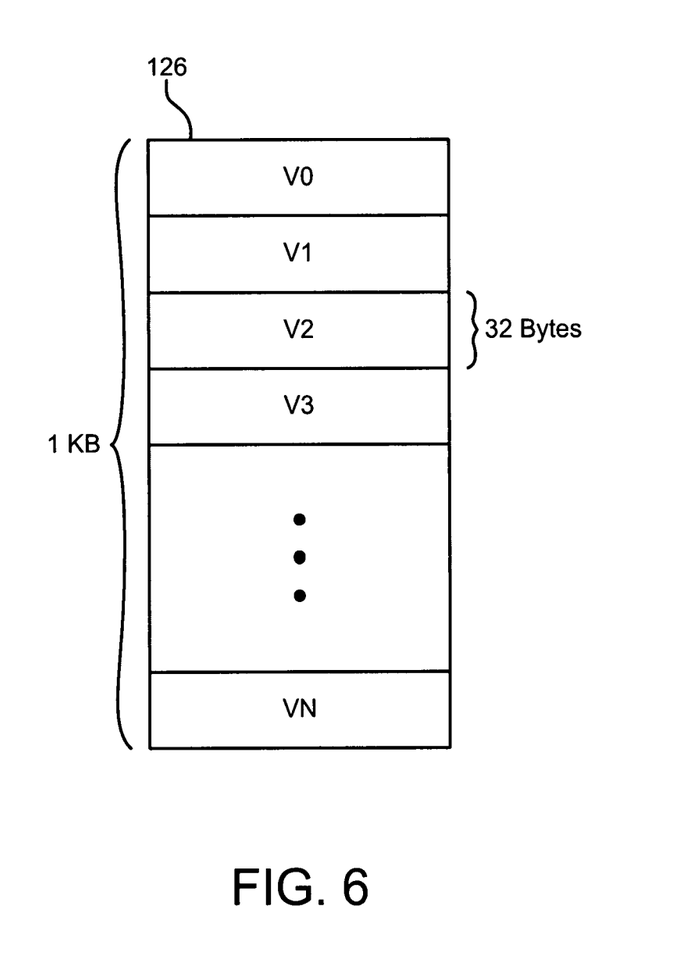
FIG. 6 illustrates a schematic diagram of another embodiment of a vertex cache.

FIG. 6 illustrates a schematic diagram of another embodiment of a vertex cache 126. In the depicted embodiment, the size of the vertex cache 126 is 1 Kbyte (the same as in FIG. 5), but the vertex size is 32 bytes (double the vertex size in FIG. 5). Hence, the vertex cache 126 shown in FIG. 6 has half the number of cache lines compared to the vertex cache 126 of FIG. 5. Specifically, the depicted vertex cache 126 could have as many as 32 cache lines.

In one embodiment, the cache configuration logic 106 operates to provide as many cache lines in the cache 126 as possible in order to provide the highest hit rate and efficiency from the vertex cache 126. In another embodiment, the cache configuration logic 106 also maintains a minimum cache line size (i.e., a threshold cache line size), which effectively limits the maximum number of cache lines so that cache performance is not degraded by having too many cache lines. For example, the minimum threshold cache line size may be set at 16 bytes so that the smallest possible cache line size is 16 bytes, although the cache configuration logic 106 may establish a cache line size greater than 16 bytes. In one embodiment, the minimum threshold cache line size is set to a standard binary size (e.g., 2, 4, 8, 16, etc.) so that implementations of the vertex cache 126 are relatively simple. Alternatively, another minimum cache line size could be implemented in other embodiments of the cache configuration logic 106.

Figure 7:
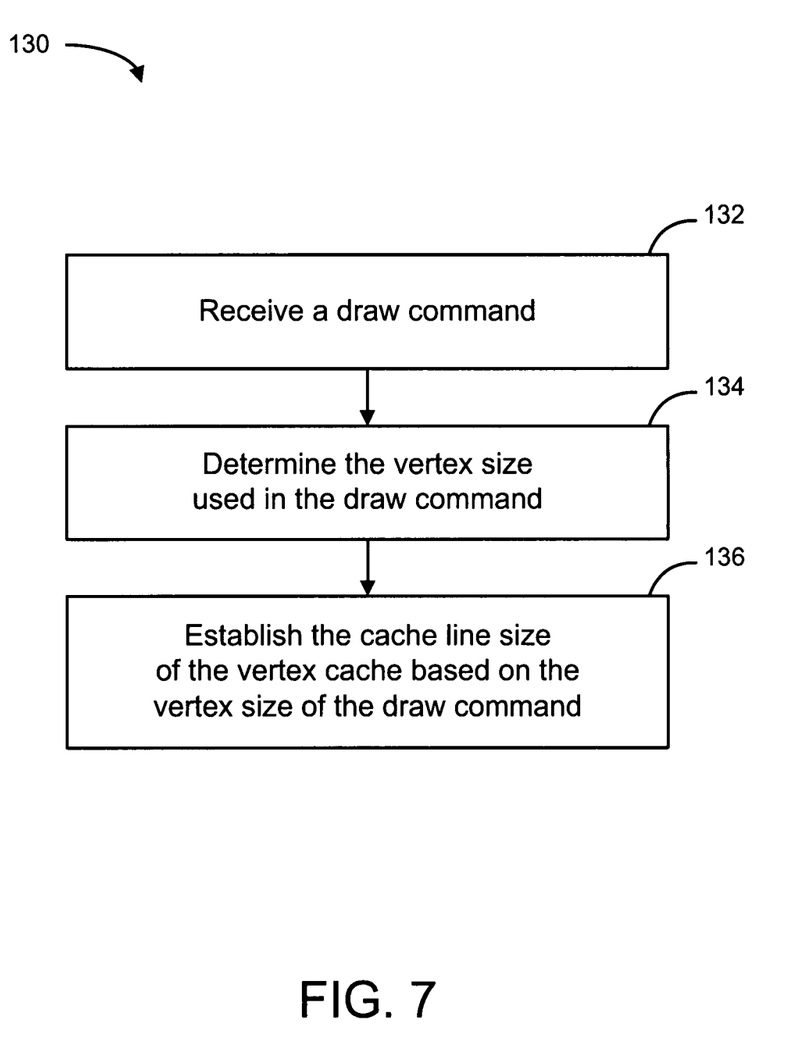
FIG. 7 illustrates a schematic flow chart diagram of one embodiment of a cache configuration method.

FIG. 7 illustrates a schematic flow chart diagram of one embodiment of a cache configuration method 130. Some embodiments of the cache configuration method 130 may be implemented with the cache configuration logic 106 in the computer graphics system 100. Other embodiments of the cache configuration method 130 may be implemented with other computer graphics systems.

The depicted cache configuration method 130 begins as the GPU 104 receives 132 a draw command. As explained above, the draw command relates to an object to be rendered on the display device 110. Subsequently, the cache configuration logic 106 determines 134 the vertex size used in the draw command. If multiple vertex sizes are used in a single command, then the cache configuration logic 106 could determine the largest vertex size used by the command. After determining the appropriate vertex size of the draw command, the cache configuration logic 106 establishes 136 the cache line size of the vertex cache 126 based on the vertex size of the draw command. Exemplary operations related to establishing the cache line size are provided in FIG. 8. The depicted cache configuration method 130 then ends.

Figure 8:
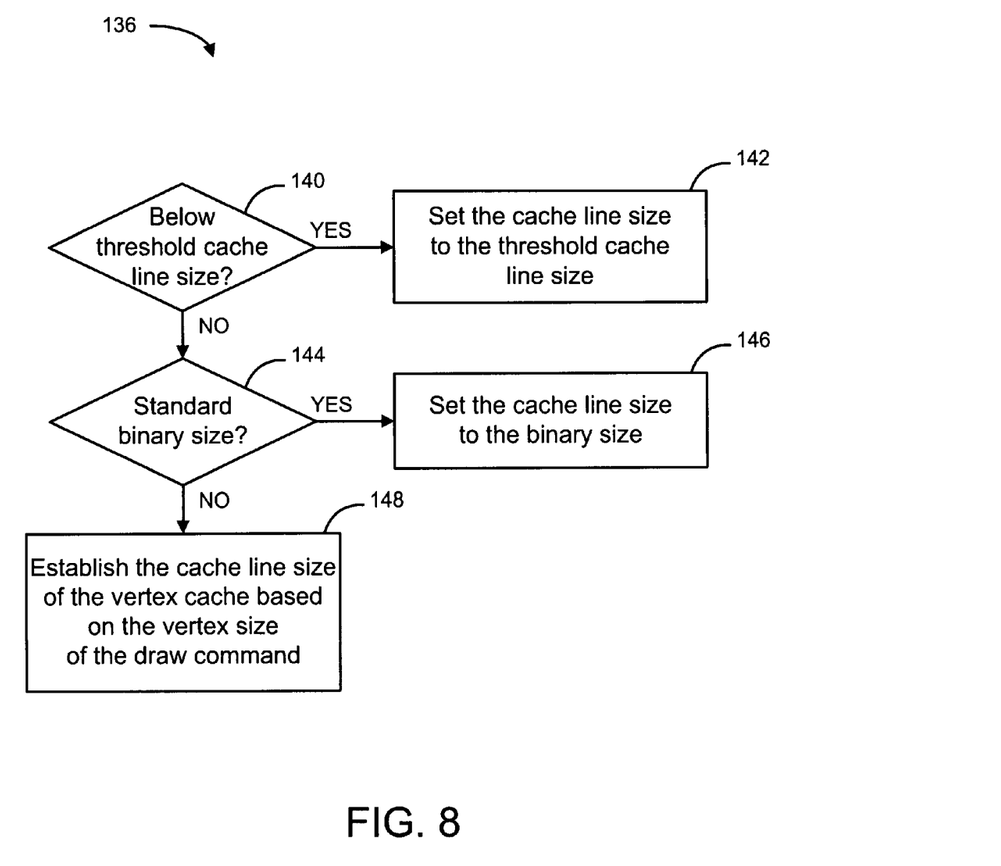
FIG. 8 illustrates a schematic flow chart diagram of one embodiment of the cache configuration operation of the cache configuration method of FIG. 7.

FIG. 8 illustrates a schematic flow chart diagram of one embodiment of the cache configuration operation 136 of the cache configuration method 130 of FIG. 7. Although exemplary details of an embodiment of the cache configuration operation 136 are provided herein, other embodiments of the cache configuration method 130 and the cache configuration operation 136 may implement fewer or more operations related to establishing the cache line size of the vertex cache 126.

The depicted cache configuration operation 136 includes determining 140 if the vertex size of the draw command is below a threshold cache line size. In one embodiment, the threshold cache line size is a minimum cache line size. Additionally, the threshold cache line size may be a standard binary number, as described above. If the vertex size is below the threshold cache line size, then the cache configuration logic 106 sets 142 the cache line size of the vertex cache 126 to the threshold cache line size. For example, if the vertex size is 8 bytes and the threshold cache line size is 16 bytes, then the cache configuration logic 106 sets the cache line size of the vertex cache 126 at 16 bytes.

Otherwise, if the vertex size is not below the threshold cache line size, then the cache configuration logic 106 determines 144 if the vertex size is a standard binary size. If the vertex size is a standard binary size, then the cache configuration logic 106 sets 146 the cache line size to the binary size that is the same as the vertex size. For example, if the vertex size is 32 bytes, then the cache configuration logic 106 sets the cache line size of the vertex cache 126 at 32 bytes. Otherwise, if the vertex size is not a standard binary size, for some reason, then the cache configuration logic 106 sets 148 the cache line size of the vertex cache 126 to a size based on the vertex size of the draw command. In one embodiment, setting the cache line size based on the vertex size includes rounding the cache line size up to the next standard binary size. Alternatively, the cache line size could potentially be set to a non-binary size. The depicted cache configuration operation 136 then ends.

It should be noted that embodiments of the cache configuration method 130 may be implemented in software, firmware, hardware, or some combination thereof. Additionally, some embodiments of the cache configuration method 130 may be implemented using a hardware or software representation of one or more algorithms related to the operations described above. For example, software, hardware, or a combination of software and hardware may be implemented to compute the number of bytes to be used for a given vertex buffer 124. In one embodiment, software or hardware implementation of the algorithm binds and limits the number of valid tags for the duration of each graphical command.

As explained above, embodiments of the system and method described herein provide a way to increase vertex cache efficiency for a given size of cache ram. Additionally, some embodiments improve the performance and reduce the cost of GPU 104. Other embodiments may provide or exhibit other beneficial uses.

Embodiments of the invention also may involve a number of functions to be performed by a computer processor such as a central processing unit (CPU), a graphics processing unit (GPU), or a microprocessor. The microprocessor may be a specialized or dedicated microprocessor that is configured to perform particular tasks by executing machine-readable software code that defines the particular tasks. The microprocessor also may be configured to operate and communicate with other devices such as direct memory access modules, memory storage devices, Internet related hardware, and other devices that relate to the transmission of data. The software code may be configured using software formats such as Java, C++, XML (Extensible Mark-up Language) and other languages that may be used to define functions that relate to operations of devices required to carry out the functional operations related described herein. The code may be written in different forms and styles, many of which are known to those skilled in the art. Different code formats, code configurations, styles and forms of software programs and other means of configuring code to define the operations of a microprocessor may be implemented.

Within the different types of computers, such as computer servers, that utilize the invention, there exist different types of memory devices for storing and retrieving information while performing some or all of the functions described herein. In some embodiments, the memory/storage device where data is stored may be a separate device that is external to the processor, or may be configured in a monolithic device, where the memory or storage device is located on the same integrated circuit, such as components connected on a single substrate. Cache memory devices are often included in computers for use by the CPU or GPU as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform certain functions when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. Embodiments may be implemented with various memory and storage devices, as well as any commonly used protocol for storing and retrieving information to and from these memory devices respectively.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A system to process a plurality of vertices to model an object, the system comprising:
a processor to process the plurality of vertices;
a front end unit configured to communicate with the processor, the front end unit configured to communicate vertex data to the processor; and
cache configuration logic configured to communicate with the front end unit and the processor, the cache configuration logic defining a threshold line size and configured to receive a plurality of draw commands and, for each draw command, determine a vertex size of vertices of the each draw command and establish a cache line size associated with a plurality of cache lines in a vertex cache according to the vertex size of the each draw command, the cache line size at least equal to a vertex size of a drawing command if the vertex size is one of larger than and equal to the threshold line size and equal to the threshold line size if the vertex size is less than the threshold line size such that the cache line size is greater than the vertex size and the cache line size is never less than the threshold line size, the cache configuration logic further configured to set a number of lines of the vertex cache equal to a fixed size divided by the cache line size if the vertex size is one of greater than and equal to the threshold line size and to set the number of lines of the vertex cache equal to the fixed size divided by the threshold line size if the vertex size less than the threshold line size;
wherein the processor is further configured to store only one vertex in each cache line.

2. The system according to claim 1, wherein the cache configuration logic is further configured to establish the plurality of cache lines based on the cache line size and a total size of the vertex cache.

3. The system according to claim 1, wherein the front end unit comprises an index buffer, a vertex buffer, and the vertex cache.

4. The system according to claim 3, wherein the front end unit comprises multiple vertex buffers.

5. The system according to claim 3, wherein the cache configuration logic is further configured to limit a number of valid tags of the index buffer for a duration of the draw command.

6. The system according to claim 1, wherein the vertex cache is implemented in a random access memory.

7. The system according to claim 1, wherein the processor comprises a graphics processing unit.

8. The system according to claim 1, wherein the processor comprises a central processing unit.

9. The system according to claim 1, wherein the processor comprises a video processing unit.

10. The system according to claim 1, wherein the plurality of cache lines can dynamically vary in number.

11. A method for dynamically reconfiguring a vertex cache for vertex processing, the method comprising:
receiving a draw command, wherein the draw command is associated with a plurality of vertices;
determining a vertex size of the plurality of vertices;
determining that the vertex size is less than a threshold size;
in response to the determining that the vertex size is less than the threshold size, establishing a cache line size associated with a plurality of cache lines in the vertex cache that is equal to the threshold size such that the cache line size is greater than the vertex size and the cache line size is never less than the threshold line size;
in response to determining that the vertex size is less than the threshold size, establishing a number of cache lines that is equal to a fixed cache size divided by the threshold size; and
storing the plurality of vertices in the vertex cache such that only one vertex is stored in each cache line.

12. The method according to claim 11, further comprising establishing the plurality of cache lines based on the cache line size and a total size of the vertex cache.

13. The method according to claim 11, further comprising maintaining the cache line size and the number of cache lines for a duration of the draw command.

14. The method according to claim 11, wherein the threshold is effective to increase a cache hit rate and efficiency of the vertex cache for the draw command.

15. The method according to claim 11, further comprising limiting a number of valid tags of an index buffer for a duration of the draw command.

16. A non-transitory computer readable storage device storing a program of machine-readable instructions, executable by a digital processor, to perform operations to facilitate vertex processing, the operations comprising:
receive a draw command, wherein the draw command is associated with a plurality of vertices;
determine a vertex size of the plurality of vertices;
establish a cache line size associated with a plurality of cache lines in the vertex cache based on the vertex size of the plurality of vertices, the cache line size at least equal to the vertex size if the vertex size is larger than or equal to a threshold size and otherwise equal to the threshold size such that the cache line size is greater than the vertex size such that the cache line size is never less than the threshold size;
establish a number of cache lines of the vertex cache equal to a fixed size divided by the vertex size if the vertex size is one of greater than and equal to the threshold line size and to set the number of lines of the vertex cache equal to the fixed size divided by the threshold line size if the vertex size less than the threshold line size; and
store the plurality of vertices in the vertex cache such that only one vertex is stored in each cache line.

17. The non-transitory computer readable storage device of claim 16, the operations further comprising an operation to establish the plurality of cache lines based on the cache line size and a total size of the vertex cache.

* * * * *